United States Patent [19]

Burke

[11] 3,830,191

[45] Aug. 20, 1974

[54] MEAT TIMER

[76] Inventor: James P. Burke, 1510 Springwood Dr., Modesto, Calif. 95350

[22] Filed: Oct. 24, 1973

[21] Appl. No.: 409,050

[52] U.S. Cl. ............. 116/67 R, 73/339 A, 73/352, 116/114.5
[51] Int. Cl. ............................................. G08b 3/06
[58] Field of Search.......... 116/67 R, 103, 106, 112, 116/114.5; 73/339 R, 343 R, 343 B, 358, 363, 368, 368.1, 368.2, 339 A, 352

[56] References Cited
UNITED STATES PATENTS

| | | | |
|---|---|---|---|
| 2,582,232 | 1/1952 | Cesaro et al. | 73/339 A |
| 2,630,776 | 3/1953 | Lewis | 116/103 |
| 3,536,027 | 10/1970 | Neal | 116/103 |
| 3,590,769 | 7/1971 | Ladany | 116/103 |
| 3,590,770 | 7/1971 | Wagner | 116/112 |
| 3,610,044 | 10/1971 | Bentz | 73/339 A |
| 3,724,360 | 4/1973 | Kliewer et al. | 116/114.5 |

*Primary Examiner*—Louis J. Capozi
*Attorney, Agent, or Firm*—John N. Randolph

[57] ABSTRACT

A timer for various meats including poultry to audibly indicate when the meat has been cooked to a desired extent. The timer includes an elongated container filled or partially filled with a solution, and having a pointed end to be forced into the meat. The other end of the container is closed and sealed by a cap which is responsive to pressure generated in the container, by the liquid being converted to steam, to effect movement of the cap to a position to allow the steam to escape from an opening of the cap, which was initially sealed, to produce an audible signal indicating that the cooking of the meat has been completed.

9 Claims, 3 Drawing Figures

PATENTED AUG 20 1974 3,830,191

MEAT TIMER

SUMMARY

It is a primary object of the present invention to provide a meat timer of extremely simple construction which is inserted into a piece of meat being cooked and which will produce an audible signal when the meat has been cooked to a desired extent.

A further object of the invention is to provide a meat timer capable of functioning to produce the audible signal at different temperatures of the meat enabling the piece of meat to be cooked well done, medium or rare.

Various other objects and advantages of the invention will hereinafter become more fully apparent from the following description of the drawing, illustrating a presently preferred embodiment thereof, and wherein:

DESCRIPTION OF THE PREFERRED EMBODIMENT

Figure 1:
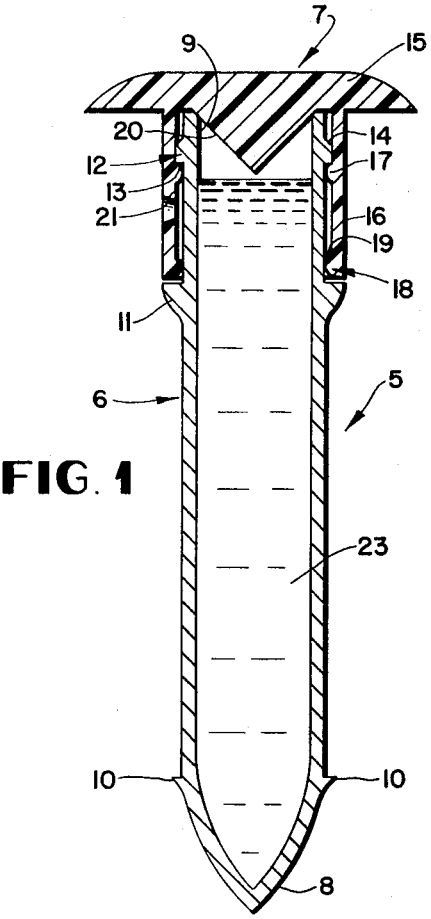
FIG. 1 is a longitudinal central sectional view showing the meat timer as it will appear when applied to a piece of meat to be cooked.

Referring more specifically to the drawing, the meat timer in its entirety is designated generally 5 and includes an elongated hollow body 6 and a cap 7. The body 6 has a closed tapered and pointed lower or forward end 8 and an open opposite end 9.

Figure 3:
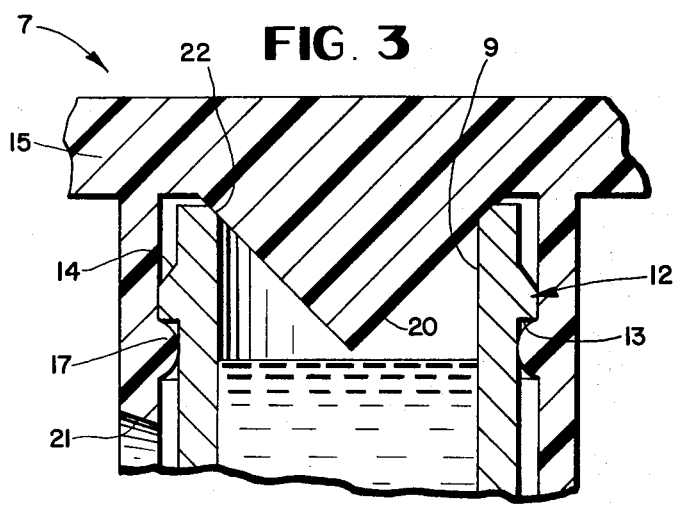
FIG. 3 is an enlarged fragmentary sectional view of the upper portion of the container as seen in FIG. 1.

The body 6, near its end 8, is provided with a plurality of spurs or projections 10 having shoulders which face away from the end 8, to anchor the body 6 in a piece of meat. The body 6 near the end 9 is provided with an annular external enlargement 11, and between said enlargement and the open end 9, the body 6 has a second external enlargement or abutment 12, as best seen in FIG. 3, which is provided with a shoulder 13, on the side thereof which faces the enlargement 11, which is disposed in a plane normal to the axis of the container body 6. The other side of the abutment 12, which faces the open end 9 and away from the enlargement 11, is provided with an inclined shoulder 14 which is inclined away from the open end 9 and which forms a cam surface, as will hereinafter be described.

The cap 7 includes a head 15 and an annular skirt 16 which extends from the inner side of the head 15. The skirt 16 has an annular internal enlargement or detent 17 disposed adjacent the head 15 and which is convexly rounded, as best seen in FIG. 3. The open end of the skirt 16 has an annular internal enlargement or detent 18. The enlargement 18 has an annular shoulder 19 facing toward the head 15.

The cap 7 is shown as being formed of a plastic material; however, said cap could be formed of other materials capable of yielding to a limited extent, for a purpose that will hereinafter become apparent. Likewise, the container body 6 may be formed of a plastic material and be capable of yielding to a limited extent, in which case the cap 7 could be of a rigid construction.

The head 15 has a centrally disposed conical portion 20 which projects into the skirt 16 and which is spaced therefrom. The skirt 16, between the detents 17 and 18, is provided with an outwardly flared opening 21. As best seen in FIG. 3, the open end 9 of the body 6 may be beveled on its inner side, as seen at 22 in FIG. 3, to seat flush against an annular portion of the projection 20, when the cap 7 is in its applied position of FIGS. 1 and 3.

The container 6 is filled to a desired level with a suitable solution 23, such as grain alcohol and water. The cap 7 is then applied to the open end 9 of the container. The rounded outer or underside 24 of the detent 18 will initially contact the cam surface 14 and be distended thereby to pass over the enlargement 12 as the cap 7 is forced onto the container 6. In the same manner, detent 17 will thereafter pass over the enlargement 12 and engage the annular shoulder 13 thereof to form a seal between the cap and container at the point of contact of the enlargements 12 and 17. The engagement of the enlargements 12 and 17 will also cause an annular portion of the projection 20 to seat against the annular surface 22 to provide a second seal between the cap and container.

Figure 2:
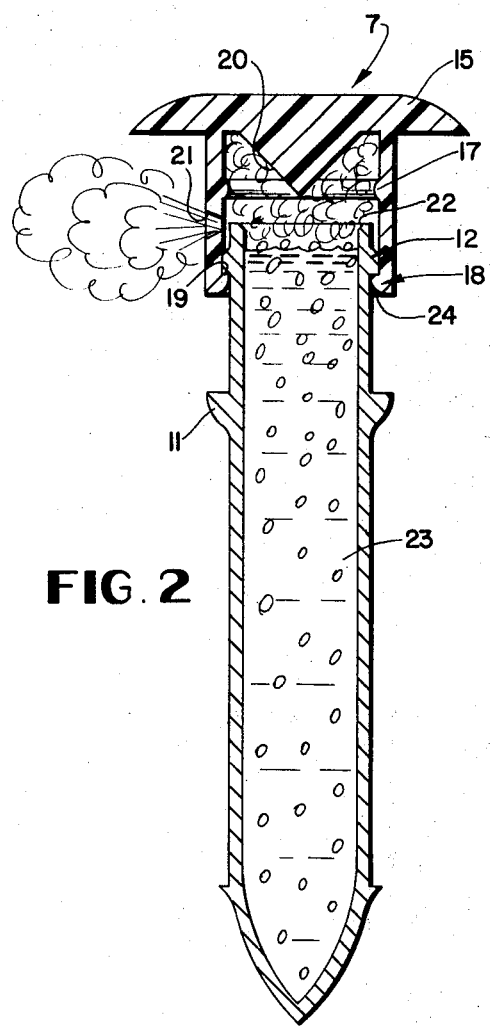
FIG. 2 is a view similar to FIG. 1 but showing the position of the timer cap after the contents of the container has been converted into steam.

The pointed end 8 is then forced into a piece of meat to be roasted. When the piece of meat reaches a desired temperature so that the cooking thereof has been completed, the solution 23 will have been converted into steam having sufficient pressure to force the rounded detent 17 to expand and pass over the abutment 12, to allow the cap 7 to move outwardly of the container 6 from its position of FIG. 2 to its position of FIG. 3. In this latter position, the opening 21 is exposed so that the steam 24 can escape therefrom thereby producing an audible signal indicating that the cooking of the meat has been completed.

The timer 5 may be made in various sizes to vary the capacities thereof, to vary the temperature of the meat when sufficient steam pressure has been generated to produce the audible signal, and each timer may be marked to indicate the meat temperature at which the signal will be produced, assuming that the same amount of solution is used in the timers of the different sizes. Alternatively, the amount of solution 23 may be varied, without changing the size of the timer body, to vary the temperature at which the alarm will be sounded.

Due to the rounded shape of the detent 17, said detent will more readily pass the abutment 12 than the detent 18 which has a flat shoulder 19 to abut flush against the shoulder 13 to retain the cap 7 attached to the body 6. The cap 7 may be rocked from its position of FIG. 2 to disengage the detent 18 from the abutment 12, so that the cap 7 can be removed and the container 6 refilled to a desired extent with the solution 23, after which the cap 7 is reapplied as heretofore described.

Various modifications and changes are contemplated and may obviously be resorted to, without departing from the function or scope of the invention.

I claim as my invention:

1. A meat timer comprising a hollow sealed body adapted to be inserted into a piece of meat to be cooked, said body containing a liquid which is converted to steam when the meat reaches a predetermined temperature, said body comprising two movably connected parts, one of said parts having a steam escape port movable with said part in response to the steam pressure to an exposed position to permit escape of the steam from the body, said port being shaped such that the escaping steam produces an audible signal.

2. A meat timer as in claim 1, said movable part constituting a cap, the other part comprising a container having an open end normally closed by said cap.

3. A meat timer as in claim 2, said cap including a head and an annular skirt projecting from said head for engaging over the open end of the container, said container having an external abutment, said skirt having an internal detent engaging said abutment for retaining the cap in a sealed position on the container, and a second detent for retaining the cap in an unsealed portion on the container and with said escape port open.

4. A meat timer as in claim 3, said cap head having an internal projection engaging in and sealing the open end of the container in a sealed position of the cap.

5. A meat timer as in claim 4, said first mentioned detent being rounded to provide a cam surface to be cammed over said abutment in response to a predetermined steam pressure.

6. A meat timer as in claim 5, said second detent having a shoulder disposed for flush abutting engagement against a shoulder of the abutment to retain the cap in its unsealed position applied to the container.

7. A meat timer as in claim 6, at least one of said parts being formed of a material possessing a limited elasticity to permit said detents to be forced over said abutment.

8. A meat timer as in claim 7, said detents and abutment having co-acting cam surfaces to facilitate applying the cap to the container.

9. A meat timer as in claim 1, said container having a closed pointed end adapted to be inserted into the meat, and spurs projecting from the body to resist removal of the timer from the meat.

* * * * *